United States Patent
Fox et al.

(10) Patent No.: US 12,060,275 B2
(45) Date of Patent: Aug. 13, 2024

(54) METHOD OF PREPARING SILICON CARBIDE AND FILTERS MADE THEREFROM

(71) Applicant: Lehigh University, Bethlehem, PA (US)

(72) Inventors: John T. Fox, Sellersville, PA (US); Kun Yang, Bethlehem, PA (US)

(73) Assignee: LEHIGH UNIVERSITY, Bethlehem, PA (US)

(*) Notice: Subject to any disclaimer, the term of this patent is extended or adjusted under 35 U.S.C. 154(b) by 1373 days.

(21) Appl. No.: 16/437,725

(22) Filed: Jun. 11, 2019

(65) Prior Publication Data

US 2020/0002177 A1    Jan. 2, 2020

Related U.S. Application Data

(60) Provisional application No. 62/744,519, filed on Oct. 11, 2018, provisional application No. 62/685,597, filed on Jun. 15, 2018.

(51) Int. Cl.
| | | |
|---|---|---|
| C01B 32/984 | (2017.01) | |
| B01D 39/20 | (2006.01) | |
| B01D 46/24 | (2006.01) | |
| B01J 27/053 | (2006.01) | |
| C04B 35/573 | (2006.01) | |

(Continued)

(52) U.S. Cl.
CPC ........ *C01B 32/984* (2017.08); *B01D 39/2068* (2013.01); *B01D 39/2082* (2013.01); *B01D 46/2425* (2013.01); *B01D 46/2429* (2013.01); *B01D 46/24491* (2021.08); *B01D 46/2451* (2013.01); *B01D 46/2482* (2021.08); *B01J 27/053* (2013.01); *C04B 35/573* (2013.01); *C04B 35/62281* (2013.01); *C04B 35/65* (2013.01); *B01D 2239/025* (2013.01); *B01D 2239/10* (2013.01); *B01D 2239/1208* (2013.01); *B01D 2239/1291* (2013.01); *C01P 2002/72* (2013.01); *C01P 2002/85* (2013.01); *C01P 2004/03* (2013.01); *C01P 2004/20* (2013.01); *C01P 2006/10* (2013.01);

(Continued)

(58) Field of Classification Search
None
See application file for complete search history.

(56) References Cited

U.S. PATENT DOCUMENTS 4,789,536 A * 12/1988 Schramm ................ C30B 29/36
423/346

FOREIGN PATENT DOCUMENTS

| DE | 102015103739 A1 * | 9/2016 | ........... C04B 35/522 |
|---|---|---|---|
| WO | WO-2014043612 A1 * | 3/2014 | ........... C01B 32/914 |

OTHER PUBLICATIONS

Li et al., Synthesis of silicon carbide whiskers using reactive graphite as template, Ceramics International, 2014, 1481-1488 (Year: 2014).*

(Continued)

*Primary Examiner* — Sheng H Davis
*Assistant Examiner* — Keling Zhang
(74) *Attorney, Agent, or Firm* — FisherBroyles LLP

(57) ABSTRACT

A method of making SiC nanowires comprising: (a) mixing silicon powder with a carbon-containing biopolymer and a catalyst at room temperature to form a mixture; and (b) heating said mixture to a pyrolyzing temperature sufficient to react said biopolymer and said silicon power to form SiC nanowires.

22 Claims, 9 Drawing Sheets

(51) Int. Cl.
*C04B 35/622* (2006.01)
*C04B 35/65* (2006.01)

(52) U.S. Cl.
CPC ............... *C04B 2235/3826* (2013.01); *C04B 2235/602* (2013.01); *C04B 2235/656* (2013.01); *C04B 2235/77* (2013.01)

(56) References Cited

OTHER PUBLICATIONS

Khomand et al., Green synthesis of nanostructured SiCs by using natural biopolymers (guar, tragacanth, Arabic, and xanthan gums ( for oxidative desulfurization of model fuel, International Journal of Environmental Science and Technology, 16, 2359-2372, published online on May 16, 2018 (Year: 2018).*
Chemical Book, Guar gum (2022), https://www.chemicalbook.com/ChemicalProductProperty_EN_CB5253559.htm (Year: 2022).*
Machine translation of Sigmund, DE 102015103739 A1 (Year: 2016).*
Huang et al., In situ growth of silicon carbide nanowires from anthracite surfaces, Ceramics Internationals, 2011, 37, 1063-1072 (Year: 2011).*
Boger, Thorsten et al., "A Next Generation Cordierite Diesel Particle Filter with Significantly Reduced Pressure Drop," SAE International, Apr. 12, 2011.
Johnson Matthey, "A Breath of Fresh Air for Construction, Leading the world in emission control technologies," Emission Control Technologies, date unknown, but admitted prior art.

* cited by examiner

METHOD OF PREPARING SILICON CARBIDE AND FILTERS MADE THEREFROM

RELATED APPLICATION

This application claims priority to U.S. Provisional Application No. 62/685,597, filed Jun. 15, 2018, and U.S. Provisional Application No. 62/744,519, filed Oct. 11, 2018, both of which are hereby incorporated by reference.

FIELD OF INVENTION

The invention relates, generally, to the preparation of silicon carbide, and, more specifically, to the preparation of silicon carbide for use in filters.

BACKGROUND

There are over 10,000,000 diesel engines that currently, or will eventually, require diesel particulate filters. And that number continues to increase. In 2013, mobile sources, including highway and non-road vehicles, combined to be the second leading anthropogenic source of particulate matter in the United States. Particulate Matter (PM) is linked to a variety of different elements, including, for example, irritation of the airways, coughing, decreased lung function, aggravated asthma, irregular heartbeat, nonfatal heart attacks, and premature death for people with heart or lung disease. In the United States adult exposure to diesel PM is estimated to be responsible for 27,000 heart attacks, 15,000 emergency room visits for asthma, and 2.4 million lost work days. Since 1998, California classified diesel PM as a toxic air contaminant, as health risk assessment studies showed that about 70% of all airborne cancer risk is attributable to diesel PM. To lower diesel PM, all diesel-powered highway trucks produced in the U.S. since model year 2007 are equipped with a PM filter to meet EPA particulate matter emission standards of 0.01 grams per brake-horsepower-hour, and these standards are moving towards all non-road applications. To meet these PM standards, on-road diesel engine exhaust systems require diesel particulate filters (DPFs).

At this time, DPFs are only somewhat effective as they reduce particulate matter emissions from diesel vehicles by 85-90%, and often contain metal catalysts to reduce CO and hydrocarbon emissions by 70-90%. DPFs are commonly produced from cordierite and from silicon carbide. Cordierite is the preferred material as it offers ease of manufacture, low thermal expansion, and low cost. However, these cordierite DPFs have been observed to fail pre-maturely during vehicle use by pin-holing, cracking, and/or melting, thereby compromising PM reduction efficacy.

Further, prior to failing, these porous DPFs foul, or clog, from ash and soot particulate matter. This fouling induces back-pressure on diesel engines, causing diesel vehicles to consume more fuel, lower power output, negatively affect engine durability, and even render the engine/vehicle inoperable. To lower backpressure DPFs can be regenerated during on-board regeneration (via heating), but this regeneration only burns off soot particulates. Furthermore, it is during this high temperature on-board regeneration that cordierite DPFs are harmed due to the chemical composition of ash components within diesel particulates, which leads to early failure of cordierite DPFs.

Silicon carbide (SiC) diesel particulate filters are commercially available and offer superior chemical robustness compared to cordierite. However, SiC DPFs are more difficult, more expensive, and more energy intensive to manufacture. Furthermore, conventional silicon carbide DPFs have lower porosity, which lowers overall filtration capacity. Due to SiC properties and manufacturing challenges, SiC DPFs consist of modules cemented together. Porous SiC materials are promising to control PM, but manufacturing challenges and lower filtration capacity result in porous SiC taking a distant second in the DPF commercial market.

By way of background, the most commonly used silicon carbide nanowire (SCNW) synthesis method is vapor-liquid-solid (VLS). In general, the VLS method is carried out by dissolving silicon and carbon containing vapors in a melting catalyst droplet. The catalysts droplets also usually comprised of iron, nickel, copper or gold which act as "seeds." For example, in a conventional VLS method, a silicon wafer substrate and gallium nitride powder are heated in a tube furnace in the presence of methane gas which results in SCNW formation. Iron is often used as a catalyst. Typical precursor materials include graphite and Si.

Beyond the VLS method, more exotic methods of SCNW formation found in literature include laser ablation, autoclave methods, microwave, electrospinning, and use of expensive precursor materials. For example, laser ablation methods have been used to ablate SiC ceramics at temperatures around 900° C. But it requires high energy to create laser beams. Electrospinning of SiC fibers on a metallic fiber collector through a high voltage generator have been reported to form continuous yarns. And microwave assisted SCNW growth can occur directly on a SiC wafer. Numerous other methods and notably unique processes have been investigated by researchers to form SCNWs. However, these methods require the use of expensive precursor materials, long dwell times at high-temperatures, single direction nanotube growth, and other requirements that do not favor scalable manufacture What is needed is high porosity, easy-to-manufacture, formable SiC from low cost precursors. The present invention fulfills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicant has discovered an economical process for producing silicon carbide nanowires (SCNW) matrices by pyrolyzing a mixture of silicon powder and a biopolymer at relatively low temperatures. Compared to conventional approaches, the SCNW matrix of the present invention requires a relatively short time (e.g., 4 hours) to prepare, simple equipment, and cost-effective precursors (e.g., guar gum/silicon powder). Specifically. the process of the present invention is conducted at relatively low temperatures compared to conventional SiC production, therefore reducing energy consumption. Additionally, the process produces a high porosity material having a density considerably less than SiC produced from conventional methods, therefore reducing the amount of raw materials required for a given volume of product. Thus, the SCNW matrix synthesized as described herein has a networked structure, improved mechanical hardness, enhanced crystallinity, and favorable economics to advance the state of diesel particulate matter filtration. Replacing conventional cordierite-containing DPF with the SCNW of the present invention results in a DPF having significant advantages over conventional DPFs. For example, in addition to reducing cost has mentioned above, the DPF of the present invention has more filtration capacity due to the greater porosity of SCNW and more chemical robustness due to the use of SiC.

Accordingly, in one embodiment, the present invention relates to a process of making SCNW. In one embodiment, the process comprises: (a) mixing silicon powder with a carbon-containing biopolymer and a catalyst at room temperature to form a mixture; (b) heating the mixture to a pyrolyzing temperature sufficient to react the biopolymer and the silicon powder to form SiC nanowires.

In another embodiment, the present invention relates to a DPF comprising the SCNW of the present invention.

BRIEF DESCRIPTION OF DRAWINGS

FIGS. 1A and 1B show guar gum/silicon powder 10:3 ratio at low and high magnification levels respectively; FIGS. 1C and 1D show starch/silicon powder 10:3 ratio at low and high magnification levels respectively; and FIGS. 1E and 1F show anthracite fine/silicon powder, 2:1 ratio at low and high magnification levels respectively.

DETAILED DESCRIPTION

In one embodiment, the invention relates a method of making silicon carbide (SiC) material by growing silicon carbide nanowires (SCNWs) by pyrolyzing a mixture of silicon powder and a carbon-containing polymer. In one embodiment, the method comprises: (a) mixing silicon powder with a carbon-containing biopolymer and a catalyst at room temperature to form a mixture; (b) heating the mixture to a pyrolyzing temperature sufficient to react the biopolymer and the silicon powder to form SiC nanowires. These materials and steps are considered in greater detail below.

Figures 7A, 7B:
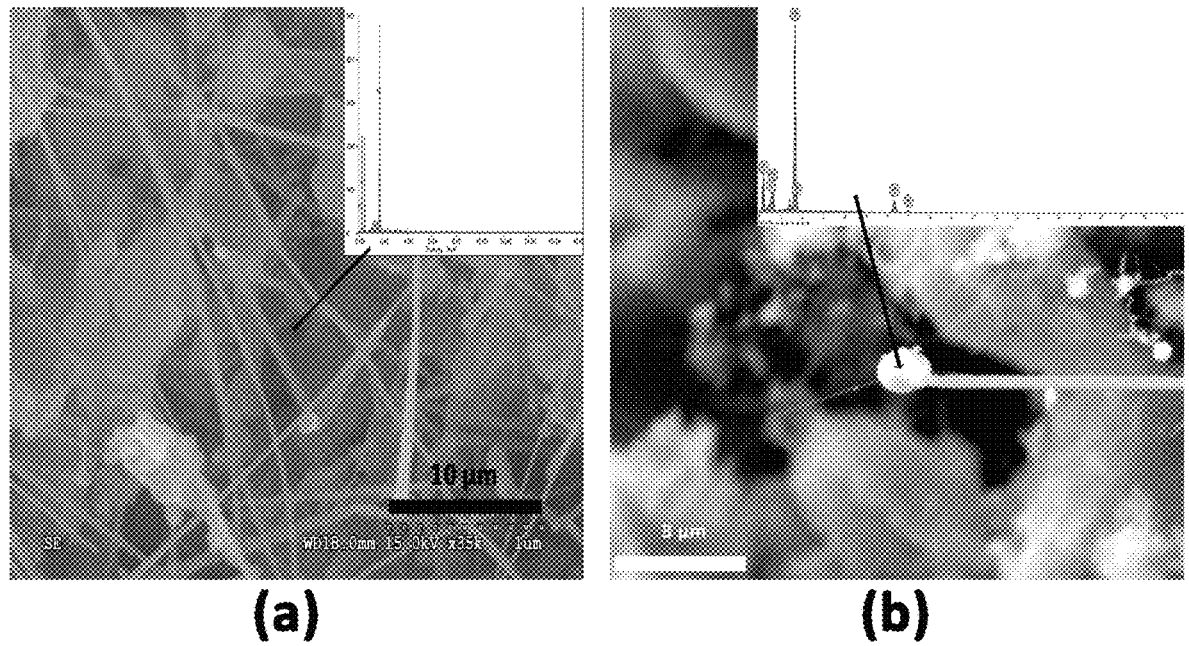
FIGS. 7A and B show EDS spectra of the SCNW tip at different magnifications.

Without being tied or restricted to a particular theory in any way, Applicant observed that, during formation, the leading tip of SCNWs acted as a "seed" for leading nanorod growth. As shown in FIGS. 7A and B, the leading tip of the nanorod possesses a spherical structure with a diameter around 1 μm, which is much thicker than the connected nanorod. Further, EDS analysis indicates that a high concentration of iron (35-40% in weight concentration) accumulates in the tip compared to the rest of the SCNWs (see FIG. 7B). For reference, the main body of the SCNW has no iron detected within the nanowire, as shown in FIG. 7A. Applicant believes that the growth of the SCNWs is similar to the growth mechanism of carbon nanotubes—i.e., the SCNW growth mechanism can be explained by a VLS reaction. The biopolymer (e.g., guar gum) and silicon powder pyrolysis will likely produce supersaturated CO and silicon vapor, while the top and bottom of melted iron particle will have different temperatures and accommodation coefficients for CO/silicon vapor, which drive the growth of SCNWs. This can further explain why iron was detected only on the tip of the nanowires as described below in connection with Example 1 below. The reaction proposed is as follows:

$$3Si\,(Vapor) + 2CO\,(vapor) \xrightarrow{FeSO4} 2SiC\,(solid) + SiO_2(solid)$$

The iron catalyzed reaction has been previously confirmed by Vakifahtoglu in 2010, who used FeCl2 as a catalyst in the formation of SiC nanowires. FeCl2 was first reduced to metallic Fe nanoparticles, and then reacted with silicon to yield iron silicides; FeSi and Fe3Si. The iron silicide did not disappear during the formation of SiC nanowires. Applicant also found that FeSi formation occurs, and iron silicide begins to form at 1200° C. and increases at 1400° C. (which was confirmed through XRD results displayed in FIG. 9 and Table 3, see Example 1 below). The FeSi likely dissolves carbon monoxide because FeSi has a large accommodation coefficient ($\alpha$=0.2 for carbon monoxide), which acted as a preferred site for Si and CO vapor to deposit.

Suitable carbon-containing biopolymers include starches and plant gums, examples as such include; corn starch, waxy maize starch, potato starch, guar gum, locust bean gum, tara gum, beta glucan, gum arabic, among others. Applicant has found that the choice of carbon-containing biopolymer may vary, although the selection tends to have a bearing on the effectiveness of the SCNW growth as discussed below in Example 1. In one embodiment, the biopolymer is guar gum, which has been shown to have superior performance relative to the other materials tested in Example 1.

Suitable silicon powders are relatively fine with high purity. Specifically, in one embodiment, the silicon is at least 95% pure, and, in one embodiment, at least 99% pure. In one embodiment, the silicon powder has a particle size no greater than US Mesh #500, and, in one embodiment, has a particle size no greater than US Mesh 120 (125 microns).

Figures 4A, 4B, 4C:
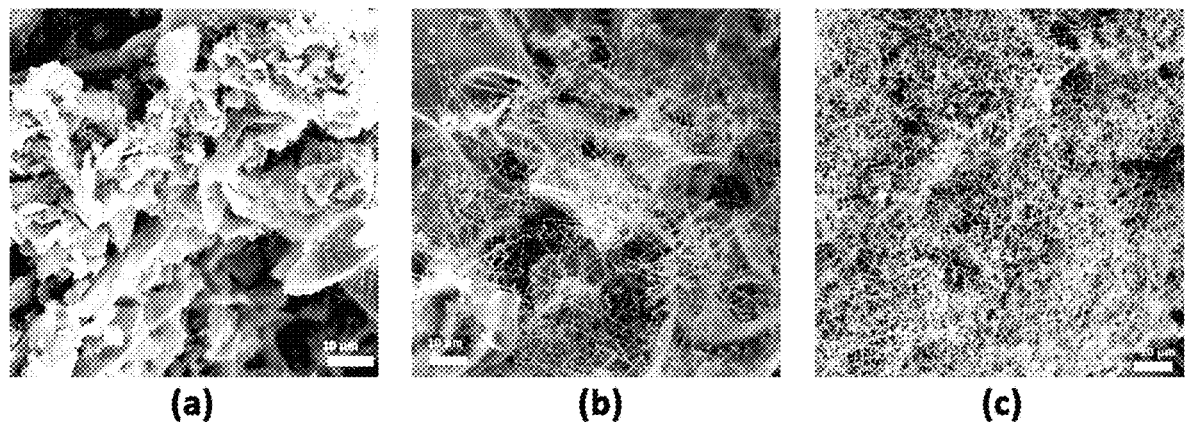
FIG. 4A-C show SEM images of SCNWs from variable guar gum/silicon powder ratio of 3 g:3 g, 5 g:3 g, and 10 g:3 g, respectively.

The weight ratio of the biopolymer to the Si powder to may vary, although a higher ratio may be preferred in some embodiments. In one embodiment, the ratio is between 2:1 and 10:1, and, in one embodiment, the ratio is between 1:1 and 10:1, and, in one embodiment, 5:3. In one embodiment, in which guar gum is the biopolymer, increasing the concentration of guar gum (e.g., from 5:3 and 10:3) resulted in the SCNWs growing from the silicon particle surface more robustly, forming longer nanowires and finally twisting together to form matrix structures as seen in FIGS. 4B and 4C. Since the guar gum has a substantially lower melting and vaporization temperature, as compared to silicon powder, the guar gum likely creates carbon vapor at low temperatures which is then deposited within the melted silicon to produce SCNWs. Therefore, increasing the guar gum fraction facilitates the formation of SCNWs, and reduces the silicon particle size, as discussed in Example 1 and shown in FIGS. 4A-C.

In one embodiment, the catalyst is iron-based. Suitable iron-based catalysts include, for example, binary iron compounds. In one embodiment, the catalyst comprises iron sulfate.

In one embodiment, the mixture may also comprise other materials such as volumizers, binders, fillers, pigments, precious metals for air emission catalysts and other additives. In one embodiment, the mixture comprises water (deionized).

In one embodiment, prior to the heating, the mixture is molded such that, after the heating, the SiC nanowires and other pyrolyzed portions of the mixture are configured as a wafer. To facilitating molding, in one embodiment, a binder is added to the mixture. However, in an alternate embodiment, the biopolymer used not only supplies the carbon, but also functions as a binder to facilitate molding of the mixture without the need for a dedicated binder.

The molding step may include packing the mixture into a mold or otherwise configuring the mixture into a three-dimensional shape using conventional means. In one embodiment, the mixture is shaped to enhance it filtering characteristics. In one embodiment, the mixture is honey-combed shaped.

In one embodiment, once the mixture is molded, it is cured to remove water and create handling strength. The curing processes is generally, although not necessarily, conducted at a temperature below the pyrolyzing temperature. In one embodiment, the curing temperature is below 200° C., and, in one embodiment, the temperature is between 90 and 115°C.

An important feature of the present invention is that the pyrolyzing step is conducted at a lower temperature than conventional SiC formation temperature (which is usually at temperatures around 2000° C.). Here, the temperature is below 1600° C., and, in one embodiment, is no greater than 1500° ° C., and, in one embodiment, is between 800 and 1500° C., and, in a more particular embodiment, is between 900 and 1400° C., and, in an even more particular embodiment, is between about 1000 and 1400° C. As discussed below in Example 1, the SiC peaks in an XRD profile increased significantly from 900° C. to 1400° C. (see FIG. 9). The increase in SiC peaks indicates that the reaction between silicon and the biopolymer (e.g., guar gum) is facilitated by increasing temperature. At 1400° ° C., the high and sharp SiC peaks indicate that there is high purity crystalline phase SiC that is produced by silicon and guar gum.

After pyrolysis, the surface is highly porous with numerous SCNWs cross-linked and twisted together to form a networked structure. The SCNW formation varies as discussed below in Example 1. Some SCNWs form as single straight lines, while other SCNWs form as thinner nanowires, intertwined with other nanowires nearby. Furthermore, the stacking faults in the SiC nanowire (as discussed below in Example with respect to FIG. 8C) grow perpendicular to the growth direction of SCNWs. Notably, the presence of the stacking faults in Example 1 indicates that the SCNW growth is led by FeSi and accumulates through a layer structure.

In one embodiment, the invention also relates to the wafer made from the process described above. Such a wafer has various features that lend to wafer to filter applications, among other applications, requiring high heat tolerance and high porosity. In particular, the porosity of the wafer is higher than conventional SiC materials. The increased porosity is desirable not only to enhance filtering capacity, but also to reduce the wafer's density, which correlates to less material being used for a given volume-another cost reducing feature of the present invention.

In one embodiment, the wafer has a porosity of at least 20% by measure of SEM void space, and, in one particular embodiment, the porosity is at least 25%, and, in one more particular embodiment, the porosity is at least 30%. In one embodiment, the wafer has a density of less than 200 lbs/ft3, and, in one particular embodiment, the density is less than 184 lbs/ft3.

In one embodiment, the SCNW have a core/shell structure. In one embodiment, the average diameter of the SCNWs measured from TEM images is around 50 nm.

In one embodiment, a filter is made from the wafer described above. The filter may be a single wafer, or it may be a configuration of two or more wafers. Furthermore, the wafer(s) may be further shaped after pyrolyzing. Such shaping can be performed using known techniques such as machining/sanding/sawing etc.

In one embodiment, the filter is characterized by a flow resistance of less than 10 kPa through a 12" long honeycomb filter.

Example 1

(a) Materials Used

The silicon powder used was purchased from Sigma Alrdich, and comprises particles passing through a US Mesh #300 sieve and possessed a purity of 99%. Three varieties of carbon containing materials were utilized during the study, including guar gum, anthracite fines, and corn starch powder. Guar gum powder used in this research was purchased from Sigma Aldrich and the particles used passed through a US mesh #300 sieve. Anthracite coal was purchased from Kimmel's Coal and Packaging (Wiconisco, PA), and the anthracite coal was crushed and sieved. The coal particles used passed through a US mesh #300 sieve. Corn Starch powder used herein was purchased from Fisher Scientific and the particles passed through a US mesh #300 sieve.

When using anthracite fines, collagen binder was utilized, which was provided by Entelechy (Plymouth, MI).

The iron sulfate particles (FeSO4) were utilized as a catalyst, were purchased from Fisher Scientific. All the samples produced used the materials listed above, and when needed were mixed with deionized water.

(b) Precursor Preparation

The silicon powder was first mixed with the carbon containing materials, anthracite fines, starch powder, or guar gum powder. When producing the anthracite-silicon mixture, collagen was used as binder. The collagen was first dissolved into warm (70° C.) deionized water to denature the collagen, and then mixed into the anthracite-silicon mixture. For starch-silicon and guar gum-silicon mixture, no binding materials were needed as both starch and guar gum perform as binders when dissolved in water. Applicant simply added deionized water to starch-silicon and guar gum-silicon mixtures, which formed a jelly like slurry. The specific formulations are provided in Table 1. The slurry was then packed into a mold to form a wafer and cured at 105° C. for 48 hours.

TABLE 1 sample description and recipes

| sample No. | carbon source | silicon source | other additives |
|---|---|---|---|
| 1 | 3 g of guar gum | 3 g silicon powder | 10 ml deionized water + 0.05% FeSO$_4$ |
| 2 | 5 g of guar gum | 3 g silicon powder | 10 ml deionized water + 0.05% FeSO$_4$ |
| 3 | 10 g of guar gum | 3 g silicon powder | 10 ml deionized water + 0.05% FeSO$_4$ |
| 4 | 10 g of starch | 3 g silicon powder | 10 ml deionized water + 0.05% FeSO$_4$ |
| 5 | 2 g of anthracite fine | 3 g silicon powder | 2.5 ml 10% collagen + 0.05% FeSO$_4$ |
| 6 | 1.5 g of anthracite fine | 3.5 g silicon powder | 2.5 ml 10% collagen + 0.05% FeSO$_4$ |
| 7 | 2 g of anthracite fine | 1 g silicon powder | 2.5 ml 10% collagen + 0.05% FeSO$_4$ |

(c) Pyrolysis

Cured samples were pyrolyzed in a MTI tube furnace (MTI GSL 1500x) after evacuation of the alumina chamber to approximately 0.1 Torr. The samples were placed in an alumina oxide tube with an argon gas flowrate of 1 L/min, which was used to prevent the material from combusting. The furnace was then heated to 1400° C. at a rate of 5° C./min. The samples were then held isothermal for 4 hours at 1400° C. After four hours, the samples were cooled at a rate of 5° C./min. Following the thermal treatment, samples were removed from the furnace for further analysis.

(d) Analysis

SEM-EDS

The morphology of samples was examined both before and after pyrolysis, by utilizing Scanning Electron Microscopy (SEM) equipped with an Electron Dispersive Spectroscopy (EDS) (HITACHI 4300). The instrument was operated under high vacuum with a secondary electron detector. The accelerating voltage was set to 15 KeV throughout the analysis.

XRD analysis

Phase identification of samples was performed by an ambient X-Ray Diffractometry (XRD) (XRD, Rigaku, D/max-2C, Japan) using Cu Kα1 radiation, operating at a voltage of 30 KeV and current of 15 mA. The diffraction patterns were collected for 2e between 10° to 80° with a step of 0.01°. The XRD results were then analyzed by MDI Jade 6.5 (Materials Data Inc.). The samples were first crushed into powders by a mortar and pestle and then the powders were placed into an aluminum sample holder. Thus, the powder XRD pattern offered a bulk measurement and represented the average phase identity of the samples.

TEM

The detailed structural features and chemical composition of the SiC nanowires were further characterized using transmission electron microscopy (TEM), which was operated at 300 KeV (Model JEOL 1200). Samples for TEM analysis were prepared by ultrasonically dispersing the SiC nanowire samples in pure ethanol. Applicant then poured the ethanol and SiC nanowire suspension onto a Cu grid. The Cu grid laden with sample was then dried at 50° C. for 24 hours before testing.

Micro Hardness

Micro hardness was measured utilizing a Leco micro hardness tester (LM 110), the values reported herein are in Vickers hardness (HV). Each sample was prepared by embedding into an epoxy resin. The epoxy resin was allowed to cure for 24 hours. The sample was then ground and polished with both 6 and 3 μm diamond paste coated polishing pads. Applicant then randomly selected a rectangular area on the samples, indented with a load of 1 kg, and mapped the micro hardness throughout the selected area.

Effect of Different Precursor

Figures 1A, 1B, 1C, 1D, 1E, 1F:
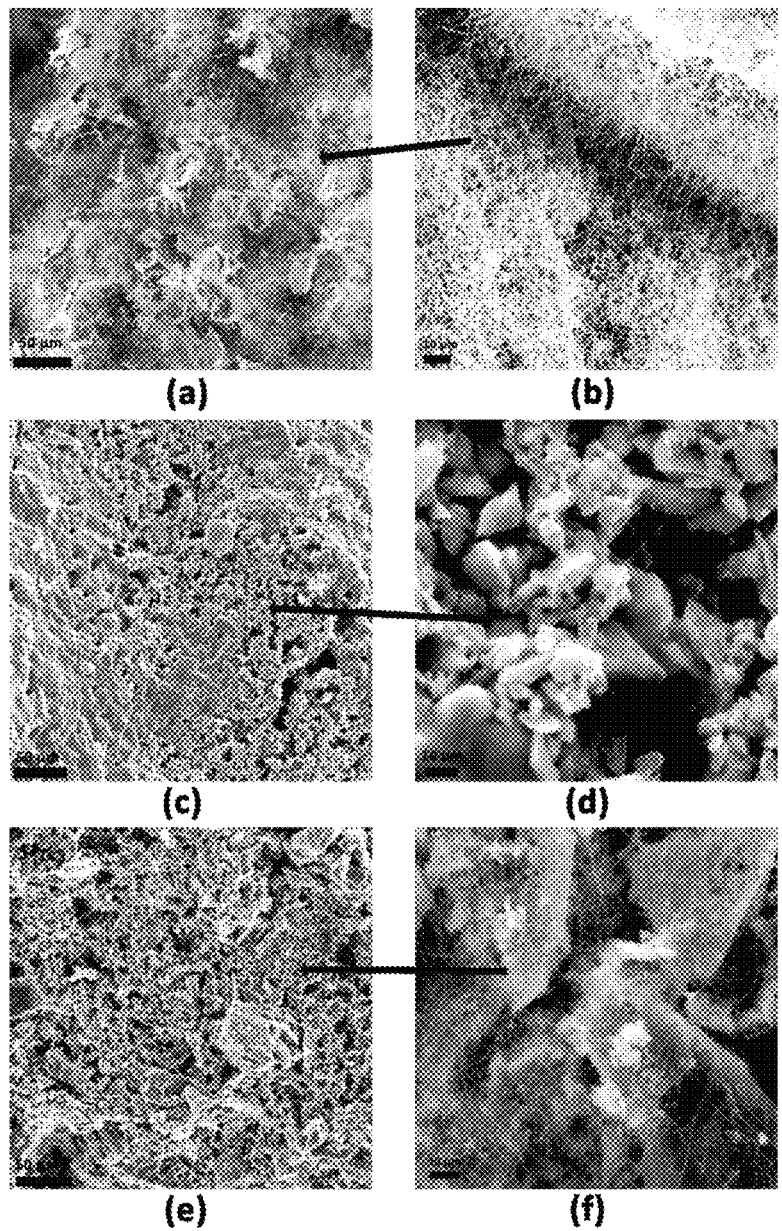
FIGS. 1A-F show SCNWs matrix wafer produced from different precursors at different magnification levels.

The effect of different precursor compositions on the growth of SCNW was investigated and is shown in FIGS. 1A-F. Applicant shaped the three different varieties of small particle precursors into wafers and sintered the materials to form a ceramic with a highly porous structure. When viewing the different varieties of sintered wafers, it is obvious that the guar gum/silicon compositions created the fullest SCNW matrix (FIGS. 1 *a* and *b*), as compared with other samples of this study. FIG. 1A provides a low magnification overview of the guar gum/silicon wafer, with the abundance of SCNWs it appears cotton-like in the SEM image. Upon viewing the guar gum/silicon sample at higher magnification, the nanowires grew on the sample with a length range from 10 to several hundred micrometers (FIG. 1B). This similar structure of abundant SCNWs does not appear for starch or anthracite fine carbon precursors, when these samples are viewed under SEM at both low magnification and high magnification SEM images. FIGS. 1C and D show the starch/silicon combination and no SCNWs are visible in the SEM images. The anthracite fine/silicon sample formed less SCNWs than found in guar gum/silicon and growth seems to originate from anthracite particles.

Figures 2A, 2B, 2C:
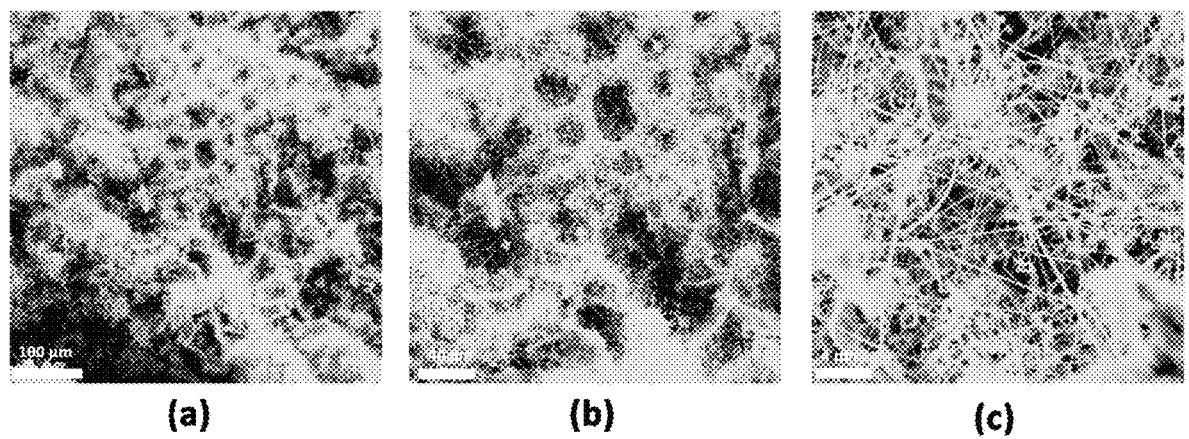
FIGS. 2A-C shows the surface microstructure of SiC wafers ranging from low magnification and high magnification.

FIGS. 2A-C display the optimized surface microstructure of SiC wafers ranging from low magnification and high magnification. After pyrolysis, the surface is highly porous with numerous SCNWs cross-linked and twisted together to form a networked structure as shown in FIG. 2C. The SCNW growth significantly increases the surface area which could facilitate the soot and ash capture capacity if these SCNW matrices were used in diesel after treatment system.

Figure 3:
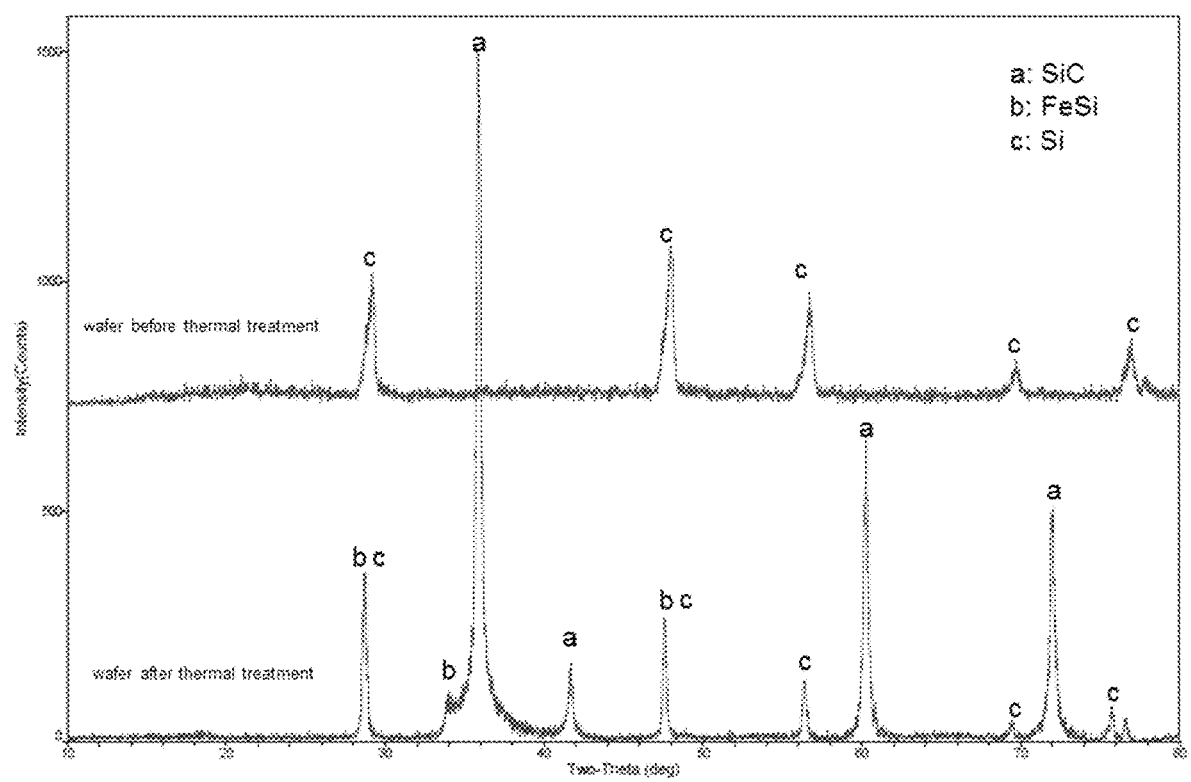
FIG. 3 shows XRD profiles of guar gum/silicon combination before and after pyrolysis.

XRD analysis before pyrolysis only identifies the crystalline Si phase, as guar gum is an organic polymer with amorphous structure (FIG. 3). The main crystalline phase following pyrolysis is SiC, followed by minor crystalline phases of FeSi and untreated Si. The FeSi is an intermediate crystalline state produced from the reaction involving the iron catalysts. Therefore, the XRD analysis FeSi confirmed the iron catalyzed reaction through the FeSi intermediate. This was further confirmed by Vakifahmetoglu (2010), who also found the iron silicide, especially FeSi and Fe3Si are the predominant phases at 1400° C. in iron catalyzed SCNW formation (Vakifahmetoglu 2010).

Effect of Polymer: Si Ratio on the Growth of SiC Nanowire

Applicant investigated the mass ratio of guar gum to silicon from 3:3 to 10:3, to determine which ratio would best facilitate the formation of SCNWs. As shown in FIG. 4A, the 3:3 ratio, the carbon source is not sufficient to create carbon vapor to deposit on silicon particles and there are very few SCNWs growth from the surface (FIG. 4A). As Applicant increased guar gum to 5:3 and 10:3, as shown in FIGS. 4B and 4C, respectively, the SCNWs grew from the silicon particle surface more robustly by increasing the ratio of guar gum to silicon, forming longer nanowires and finally twisting together to form matrix structures. Since the guar gum has a substantially lower melting and vaporization temperature, as compared to silicon powder, the guar gum likely creates carbon vapor at low temperatures which is then deposited within the melted silicon to produce SCNWs. Therefore, increasing the guar gum fraction facilitates the formation of SCNWs, and reduces the silicon particle size.

Figure 5:
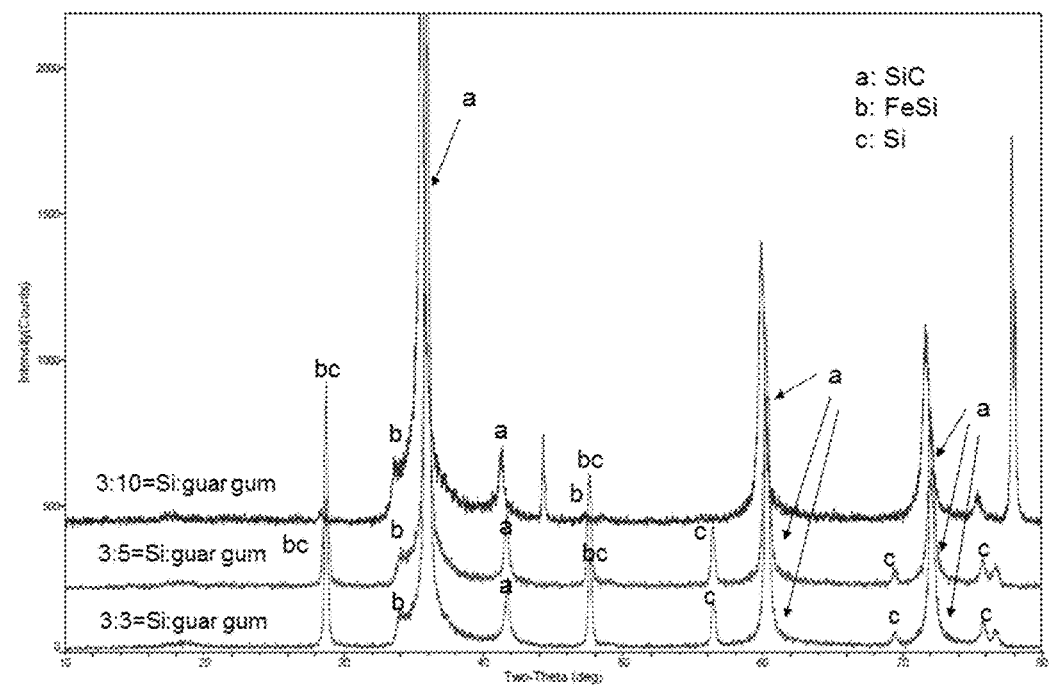
FIG. 5 shows XRD profiles of pyrolyzed wafers with different guar gum/silicon powder ratios.

XRD analysis for the three different guar gum/silicon ratios appraised the crystalline phases, with SiC as the main crystalline phase detected, followed by a minor crystalline phase of FeSi. The Si crystalline phase decreases with an increase in the guar gum/silicon ratio, and is completely eliminated when the ratio reaches 10 to 3 (FIG. 5 and Table 2). As the melting point of silicon is much higher than guar gum, Applicant anticipates excess guar gum is required as there are likely inefficiencies in this conversion process, which results in the partial reaction of silicon at ratios of 3:3 and 3:5.

TABLE 2

XRD results of the crystalline phases of SiC wafers with varying guar gum:silicon ratio.

| guar gum:silicon | crystalline phase | | |
| --- | --- | --- | --- |
| 10:3 | SiC (h) | FeSi (m) | |
| 5:3 | SiC (h) | FeSi (m) | Si (m) |
| 3:3 | SiC (h) | FeSi (m) | Si (m) |

Effect of Temperature on SCNW Formation

Figures 6A, 6B, 6C, 6D:
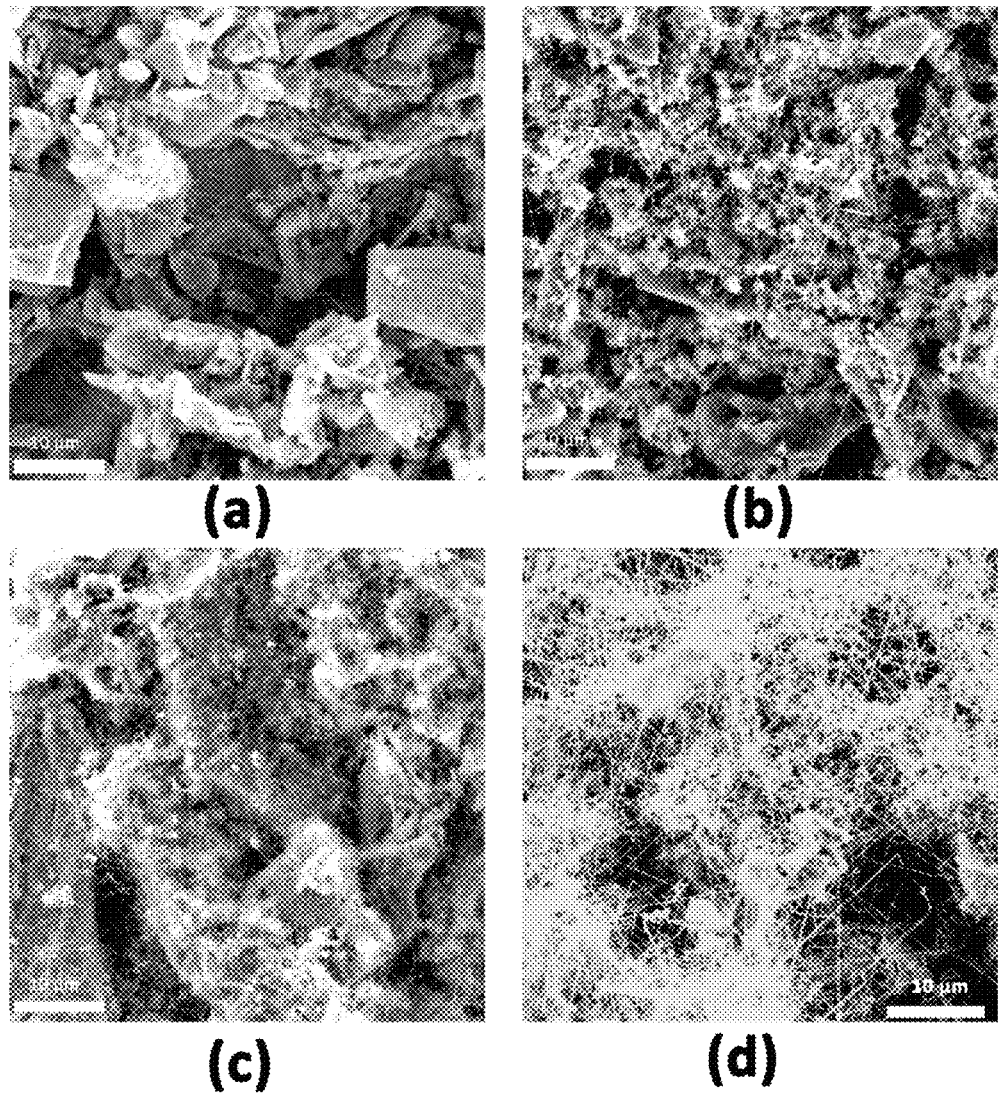
FIG. 6A-D show different morphologies of pyrolyzed SiC wafers at different temperatures 900° C.; 1100° C.; 1200° C.; 1400° C., respectively, when heated for 4 hours with a mass guar gum/silicon powder ratio of 10:3.

As displayed in FIG. 6, as the temperature increases from 900° C. to 1400° C., the amount of SCNWs formed from the guar gum/silicon precursors increases significantly. As the guar gum particles and silicon particles sintered at higher temperatures the ability to distinguish precursor materials faded, as interconnected SCNW matrices emerged as temperatures increased from 900° ° C. to 1400° C. The SCNWs grew longer and thicker as the temperature increased as shown in FIG. 6d. The leading tip of SCNWs acted as the "seeds" leading the nanorod growth, as shown in FIG. 7b. The leading tip of the nanorod possesses a spherical structure with a diameter around 1 μm, which is much thicker than the connected nanorod. Further, EDS analysis indicates that a high concentration of iron (35-40% in weight concentration) accumulates in the tip compared to the rest of the SCNWs (FIG. 7b). For reference, the main body of the SCNW has no iron detected within the nanowire, as shown in FIG. 7a. Similar to the growth mechanism of carbon nanotubes, the SCNW growth mechanism can be explained by a VLS reaction. The guar gum and silicon powder pyrolysis will likely produce supersaturated CO and silicon vapor, while the top and bottom of melted iron particle will have different temperatures and accommodation coefficients for CO/silicon vapor, which drive the growth of SCNWs. This can further explain why the iron was only detected on the tip of the nanowires. The reaction proposed is as follows:

The iron catalyzed reaction has been previously confirmed by Vakifahtoglu (2010), who used FeCl2 as a catalyst in the formation of SiC nanowires. FeCl2 was first reduced to metallic Fe nanoparticles, then reacted with silicon to yield iron silicides; FeSi and Fe3Si. The iron silicide did not disappear during the formation of SiC nanowires (Vakifahtoglu 2010). Applicant also found that FeSi formation occurs, and iron silicide begins to form at 1200° ° C. and increases at 1400° C., which was confirmed through XRD results displayed in FIG. 9 and Table 3. The FeSi likely dissolved carbon monoxide as FeSi has a large accommodation coefficient ($\alpha=0.2$ for carbon monoxide) (Daun 2012), which acted as a preferred site for Si and CO vapor to deposit.

Figures 8A, 8B, 8C, 8D:
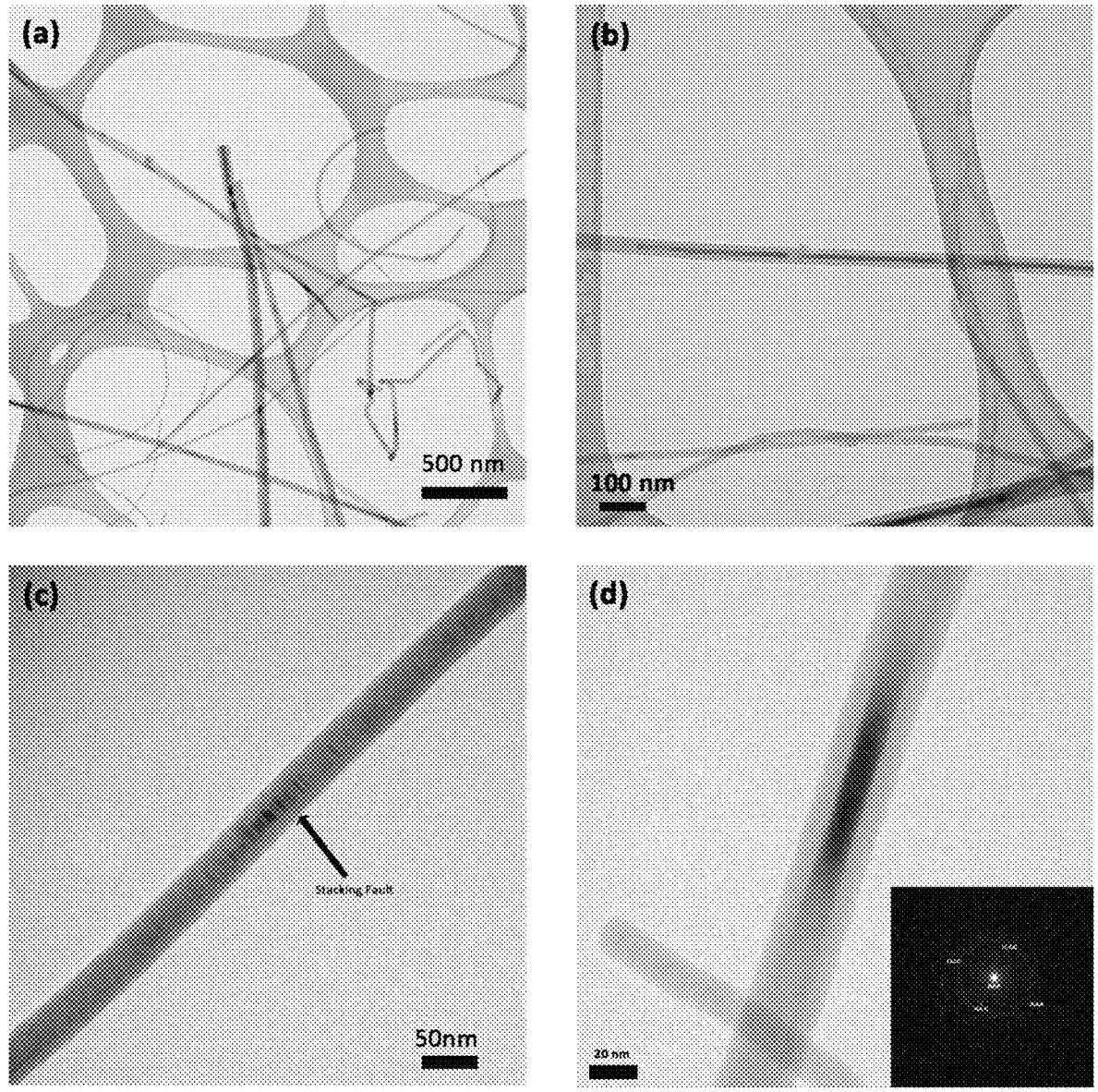
FIG. 8A shows an EDS line scan of SCNWs.
FIG. 8B shows TEM image of multiple SCNWs.
FIG. 8C shows a single SCNW.
FIG. 8D shows the corresponding SAPD pattern of the single SCNW shown in FIG. 8C.

The TEM images of the SCNWs with low magnification are shown in FIG. 8 a and b. At low magnification, in FIG. 8A, the variation in SCNW formation is evident, as some are single straight lines; other thinner nanowires are intertwined with other nanowires nearby. The TEM images also provide insight into the stacking fault in the SiC nanowire (FIG. 8C), which grows perpendicular to the growth direction of SCNWs. Notably, the presence of the stacking fault confirms that the SCNW growth is led by FeSi and accumulates through a layer structure. The selected area electron diffraction pattern (SADP) depicted in FIG. 8D confirms SCNW growth follows the [1,1,2] direction. From the TEM image, it appears that the SCNW possessed a core/shell structure. The average diameter of the SCNWs measured from TEM images is around 50 nm.

Figures 9A, 9B, 9C, 9D:
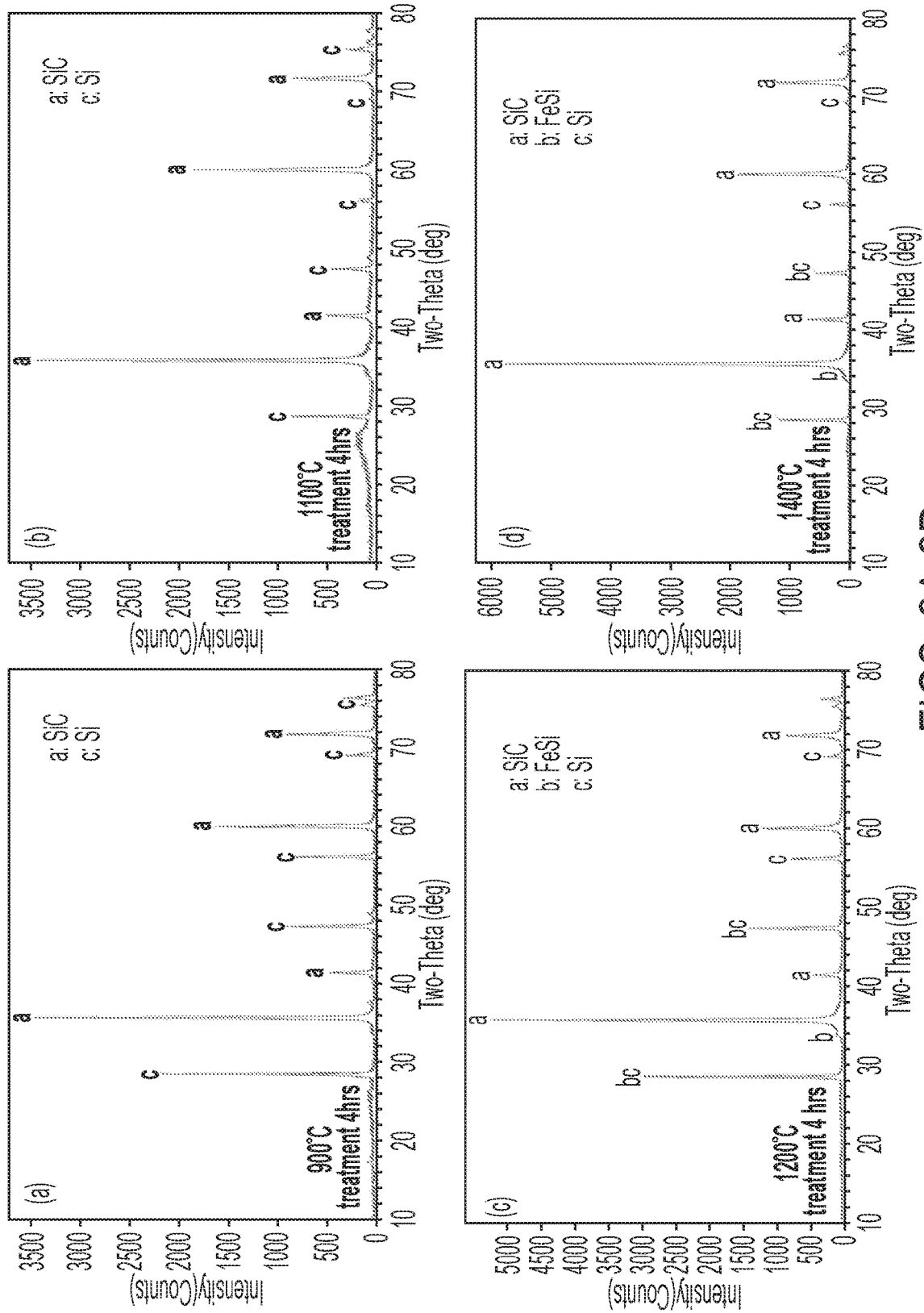
FIG. 9A-D shows XRD profiles of SiC wafers (guar gum: silicon ratio of 10 g:3 g) at elevated temperatures, 900° ° C., 1100° C., 200° C., and 1400° C., respectively.

Close examination of the temperature effect, the SiC peaks in the XRD profile increased significantly from 900° ° C. to 1400° C. (FIG. 9). The increase in SiC peaks indicate that the reaction between silicon and guar gum is facilitated by increasing temperature. At 1400° C., the high and sharp SiC peaks indicate that there is high purity crystalline phase SiC that is produced by silicon and guar gum.

TABLE 3

XRD results: Principle crystalline phases of SiC wafers under elevated temperatures.

| Temp. (° C.) | crystalline phase | | |
| --- | --- | --- | --- |
| 900 | SiC (h) | Si (h) | |
| 1100 | SiC (h) | Si (m) | |
| 1200 | SiC (h) | FeSi (m) | Si (m) |
| 1400 | SiC (h) | FeSi (m) | Si (m) |

(V) Hardness

Figures 10, 10B:
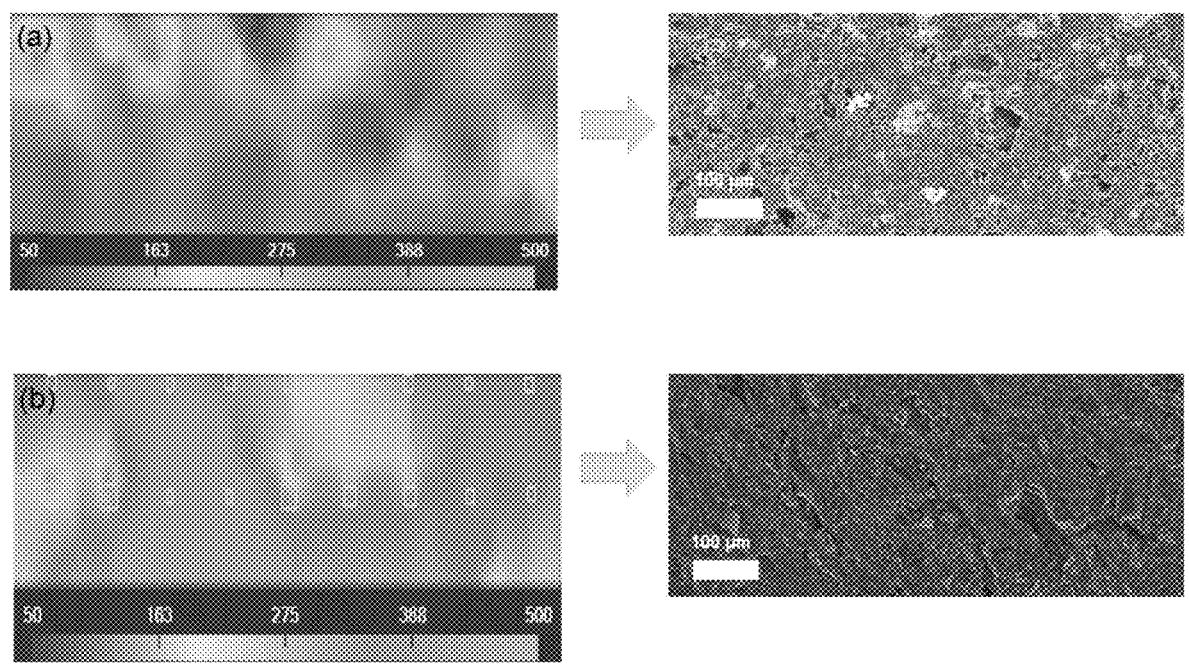
FIGS. 10A and B shows micro hardness mapping of two ceramics, (a) commercially available cordierite substrate and (b) SiC wafer manufactured with guar gum/silicon powder precursors (10:3 ratio).

The material hardness is important for ceramics used in commercial applications that require durability. FIG. 10 displays the hardness mapping of two porous ceramic samples, commercially available cordierite is compared to Applicant's porous SiC comprised of guar gum and silicon precursors (10:3 ratio). The colorimetrically scaled hardness results indicate that the average hardness for cordierite substrate is lower than the manufactured SiC wafer, as most of the cordierite is in the "red zone" or about 50 HV/1 kg. As a comparison, most of the SiC wafer hardness is located in the "green zone" or "blue zone", indicating hardness over 275 HV/1 kg. The average Vickers hardness for the samples herein are 428 HV/1 kg for the manufactured SiC wafer and 219 HV/1 kg for commercially available cordierite substrate. While the SiC wafer manufactured by Applicant holds higher Vickers hardness, it is important to note that the commercial cordierite substrate appears to be more homogeneous in hardness.

Therefore, a novel method is disclosed herein based on low cost precursors to grow SCNWs matrices. Readily available guar gum and silicon powder were used as precursor materials, which were catalyzed via iron at 1400° C. The manufactured SiC wafer has porous structures which enable application in high temperature particulate matter filtration, such as diesel exhaust filtration. When compared with other low-cost precursors in this study, the guar gum/silicon combination provides the fullest SCNW matrix. Further, the guar gum serves as both a carbon source during pyrolysis and a binding material during the forming and shaping at room temperature. The guar gum offers a convenient way to shape the SCNW material into any structural forms, including a monolithic honeycomb structure. The growth rate of SiC nanowires increases with increasing temperature from 900° C. to 1400° C. The XRD results suggest the optimum temperature is 1400° C. and the iron catalyzed the SCNW formation through an intermediate product, FeSi. This iron catalyzed reaction was further confirmed by SEM-EDS, as the leading tip contained much higher concentrations of iron. Applicant hypothesizes that the silicon and carbon vapor may deposit on the liquefied iron ball leading the growth of SCNWs. The manufactured SCNWs possess an average diameter of 20 to 100 nm with a length of 10-100 micrometers. The single crystal SiC nanowires grew along the [1,1,2] direction. The high purity SiC nanowires appear to possess a shell and core layer. The synthesized SCNW wafer possesses much higher hardness compared to commercialized cordierite substrate. Overall, this novel SCNW matrix provides a potential low-cost, easily formable, and highly porous SiC substitute to the conventional cordierite substrate used in diesel exhaust treatment systems.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of making SiC nanowires comprising the following steps:
   (a) mixing silicon powder with a carbon-containing biopolymer and a catalyst at room temperature to form a mixture;
   (b) configuring said mixture into a three-dimensional shape; and
   (c) after step (b), heating said mixture configured in said three-dimensional shape to a pyrolyzing temperature no greater than 1600° C. to react said carbon-containing biopolymer and said silicon power to form a networked structure of said SiC nanowires in said three-dimensional shape.

2. The method of claim 1, wherein said pyrolyzing temperature is between 800 and 1600° C.

3. The method of claim 1, wherein said pyrolyzing temperature is between 900 and 1400° C.

4. The method of claim 1, wherein said pyrolyzing temperature is no greater than 1400° C.

5. The method of claim 1, wherein said biopolymer is guar gum.

6. The method of claim 1, wherein said silicon powder has a particle size no greater than U.S. Mesh 120 (125 microns).

7. The method of claim 1, wherein a weight ratio of said biopolymer to said silicon powder is between 1:1 and 10:1.

8. The method of claim 7, wherein said ratio is from 3:3 to 5:3.

9. The method of claim 1, wherein said catalyst is iron-based.

10. The method of claim 1, wherein said catalyst comprises iron sulfate.

11. The method of claim 1, wherein said mixture does not comprise a binder.

12. The method of claim 1, wherein said mixture comprises water.

13. The method of claim 1, wherein, after step (c), said networked structure has an engineered geometry.

14. The method of claim 1, wherein step (b) comprises packing said mixture into a mold and curing said mixture at a curing temperature below said pyrolyzing temperature to form said mixture in said three-dimensional shape.

15. The method of claim 14, wherein said curing temperature is below 200° C.

16. The method of claim 1, wherein, after step (c), said networked structure has a porosity of at least 15%.

17. The method of claim 16, wherein after step (c), said networked structure has a density of less than 185 lb/ft$^3$.

18. The method of claim 16, wherein after step (c), said object networked structure has a honeycomb shape.

19. The method of claim 18, further comprising, after step (c), making a filter from said networked structure.

20. The method of claim 19, wherein said making comprises further shaping said networked structure.

21. The method of claim 18, wherein after step (c), said networked structure is characterized by a flow resistance of less than 10 kPa across a 12" long honeycomb filter prior to use.

22. The method of claim 1, wherein step (b) comprises packing said mixture into a mold.

* * * * *